United States Patent
Pepin et al.

(10) Patent No.: US 10,148,440 B2
(45) Date of Patent: Dec. 4, 2018

(54) BINARY CODE AUTHENTICATION

(71) Applicant: MORPHO, Issy les Moulineaux (FR)

(72) Inventors: Cyrille Pepin, Issy les Moulineaux (FR); Johann Urvoy, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 157 days.

(21) Appl. No.: 15/104,938

(22) PCT Filed: Dec. 16, 2014

(86) PCT No.: PCT/EP2014/077999
§ 371 (c)(1),
(2) Date: Jun. 15, 2016

(87) PCT Pub. No.: WO2015/091511
PCT Pub. Date: Jun. 25, 2015

(65) Prior Publication Data
US 2016/0380771 A1  Dec. 29, 2016

(30) Foreign Application Priority Data
Dec. 16, 2013  (FR) ..................... 13 62677

(51) Int. Cl.
*H04L 9/32* (2006.01)
*G06F 21/44* (2013.01)
*G06F 21/64* (2013.01)

(52) U.S. Cl.
CPC ............ *H04L 9/3239* (2013.01); *G06F 21/44* (2013.01); *G06F 21/64* (2013.01)

(58) Field of Classification Search
CPC ......... H04L 9/3239; G06F 21/64; G06F 21/44
See application file for complete search history.

(56) References Cited

U.S. PATENT DOCUMENTS

| | | | | |
|---|---|---|---|---|
| 6,588,673 B1* | 7/2003 | Chan | .................... | G06K 19/077 |
| | | | | 235/379 |
| 8,239,686 B1* | 8/2012 | Hodzic | .................. | G06F 21/51 |
| | | | | 713/187 |
| 2006/0136332 A1* | 6/2006 | Ziegler | ................... | G06F 21/31 |
| | | | | 705/39 |
| 2007/0124818 A1* | 5/2007 | Bumiller | ............... | H04L 63/123 |
| | | | | 726/26 |
| 2009/0198618 A1* | 8/2009 | Chan | .................... | G06Q 20/02 |
| | | | | 705/66 |

OTHER PUBLICATIONS

Written Opinion of the International Searching Authority dated Mar. 31, 2015, issued in corresponding International Application No. PCT/EP2014/077999, filed Dec. 16, 2014, 8 pages.

(Continued)

*Primary Examiner* — Morshed Mehedi
(74) *Attorney, Agent, or Firm* — Christensen O'Connor Johnson Kindness PLLC

(57) ABSTRACT

The description particularly relates to methods for authenticating binary code stored in a smart card. The description also relates to systems and a computer program capable of implementing said methods, as well as to storage media containing such a computer program.

12 Claims, 2 Drawing Sheets

(56) References Cited

OTHER PUBLICATIONS

International Preliminary Report on Patentability dated Jun. 21, 2016, issued in corresponding International Application No. PCT/EP2014/077999, filed Dec. 16, 2014, 1 page.
International Search Report dated Mar. 31, 2015, issued in corresponding International Application No. PCT/EP2014/077999, filed Dec. 16, 2014, 7 pages.
Menezes, A.J., et al., "Handbook of Applied Cryptography," CRC Press, 1996, Chap. 10, "Identification and Entity Authentication," pp. 385-424; p. 390.
Written Opinion dated Mar. 31, 2015, issued in corresponding International Application No. PCT/EP2014/077999, filed Dec. 16, 2014, 6 pages.

* cited by examiner

BINARY CODE AUTHENTICATION

The application relates in particular to the protection and authentication of a code stored in a smart card.

There are numerous known techniques for ensuring that a code stored in a smart card is authentic.

Some have been standardized. This is the case in particular of the applet (particularly java) signature techniques specified by the GlobalPlatform consortium based on the so-called Open Platform specification of VISA Inc. However, these techniques do not necessarily allow easy authentication of a binary code loaded in a smart card by a card administrator.

It is also known to transmit to a smart card a GetData command retrieving a version number of the code. However, if a hacker succeeds in modifying the version number and/or the code (the consistency of both not being checked by the smart card), this technique does not constitute a guarantee of the authenticity of the code.

It is also known to compute a CRC of the code. However, this CRC is only computed on the binary code, independently of the source code.

The invention is aimed at improving the situation.

One aspect of the invention relates to a method for secure storage of a binary code in a smart card, comprising:

/a/ computing, by a secure storage system, of a first hash based on a source code, said source code corresponding to the binary code;

/b/ storing, by the secure storage system, of the first hash and the binary code in the smart card;

/c/ transmitting, by the secure storage system to an authentication system, a random number and a third hash, the third hash being computed on the basis of a concatenation of the first hash, a second hash and the random number, the second hash being computed on the basis of the binary code.

This secure storage method is advantageous in that it enables in particular a smart card supplier to provide an increased guarantee of the authenticity of a binary code that it has stored in a smart card. This can also apply to partners of the smart card supplier developing applications for the smart card, or providing smart card personalization services (these services comprising the loading of applications in the smart card). The binary code of such applications can thus be verified. A person authorized to verify the authenticity of the binary code can easily perform a verification by comparing the third hash with a third hash recomputed by means of information from the smart card.

One aspect of the invention relates to a method for authenticating a binary code stored in a smart card, comprising:

/d/ acquiring, by an authentication system, a reference third hash;

/e/ acquiring, by the authentication system, an effective third hash on the basis of a concatenation of a first hash, a second hash and a random number, the first hash being stored in the smart card, the second hash being computed on the basis of the binary code to be authenticated;

/f/ authenticating, by the authentication system, the binary code on the basis of a comparison of a reference third hash and the effective third hash.

The authentication method enables for example an authorized person to check that the content of the card conforms to what it is supposed to be.

The authorized person may belong for example to an evaluation laboratory (such as a CESTI). An evaluation laboratory may be for example an entity certifying the conformity of a smart card to a certain level (for example EAL5) of the common criteria (ISO/IEC 15408), or to a certain ITSEC level (obsolete standard but still sometimes used in France). The evaluation laboratory may also be, still by way of non-limiting example, an entity in charge of Visa or MasterCard certification (necessary to be able to produce these types of bank card). It may also be, more generally, any certification, whether it checks the security and/or conformity to more general requirements (including merely functional) of a given market (bank cards, cell phone cards such as SIM or USIM cards, health cards, driving license cards, electronic ID cards, etc.).

The method may also be implemented by technical support teams. A smart card end user, or a smart card application developer, may indeed encounter a difficulty, justifying referring a smart card to a technical support department of the supplier of the smart card in question. This technical support department (or any other person authorized to access information required to verify the authenticity of a binary code) can ensure, simply (by means of the invention), the authenticity of the binary codes protected according to the embodiments described.

A further aspect of the invention relates to a computer program comprising sequences of instructions implementing the steps of a method according to the preceding aspects of the invention when they are executed by processors.

A further aspect of the invention relates to non transitory computer-readable storage media comprising a computer program according to the preceding aspect of the invention.

A further aspect of the invention relates to a secure storage system, the secure storage system being arranged to compute a first hash on the basis of a source code, said source code corresponding to a binary code;

the secure storage system being arranged to store the first hash and the binary code in the smart card;

the secure storage system being arranged to transmit to an authentication system a random number and a third hash, the third hash being computed on the basis of a concatenation of the first hash, a second hash and the random number, the second hash being computed on the basis of the binary code.

This secure storage system is advantageous in that it enables the implementation of a method for secure storage of a binary code in a smart card according to one aspect of the invention.

A further aspect of the invention relates to an authentication system for the authentication of a binary code stored in a smart card, the authentication system being arranged to obtain a reference third hash;

the authentication system being arranged to obtain an effective third hash on the basis of a concatenation of a first hash, a second hash and a random number, the first hash being stored in the smart card, the second hash being computed on the basis of the binary code to be authenticated;

the authentication system being arranged to authenticate the binary code on the basis of a comparison of a reference third hash and the effective third hash.

This authentication system is advantageous in that it enables the implementation of a method for authentication of a binary code stored in a smart card according to one aspect of the invention.

Further aspects, aims and advantages of the invention will emerge in a non-limiting manner on reading the description of some of the embodiments thereof.

The invention will also be understood more clearly using the drawings, wherein:

FIG. 1 illustrates a system for protecting a smart card SC comprising a secure storage system S_SYS implemented by a personalization system, and an authentication system A_SYS implemented by a test system.

The personalization system, which may be installed in a factory, comprises a unit topped with a control screen CTR_SC. The personalization system comprises a smart card loading column LD_SC, represented filled to two-thirds with blank smart cards. A smart card SC extracted from the loading column LD_SC is conveyed using a conveyor belt CV_BLT to an electrical personalization module PRS, then, once the electrical personalization has been performed, to a stacking column OUT (wherein the customized cards are stored). The electrical personalization module PRS is connected via a secure link (not shown) to a development environment (not shown) and by a further secure link (not shown) to the authentication system A_SYS. This electrical personalization module PRS is arranged to receive, from the development environment, a first hash of a source code (alternatively, the electrical personalization module PRS is arranged to receive, from the development environment, the source code per se and to compute the hash thereof, referred to as the first hash). The electrical personalization module PRS is arranged to store this first hash in the smart card SC. The personalization module PRS is arranged to receive, from the development environment, a binary code corresponding to a compiled version of the source code, and to store this binary code in the smart card SC. The electrical personalization module PRS is also arranged to compute a second hash equal to the hash of the binary code, to generate a random number, and compute a third hash equal to the hash of a concatenation of the first hash, the second hash and the random number. The electrical personalization module PRS is arranged to transmit the third hash and the random number to the authentication system (via the secure link).

Figure 1:
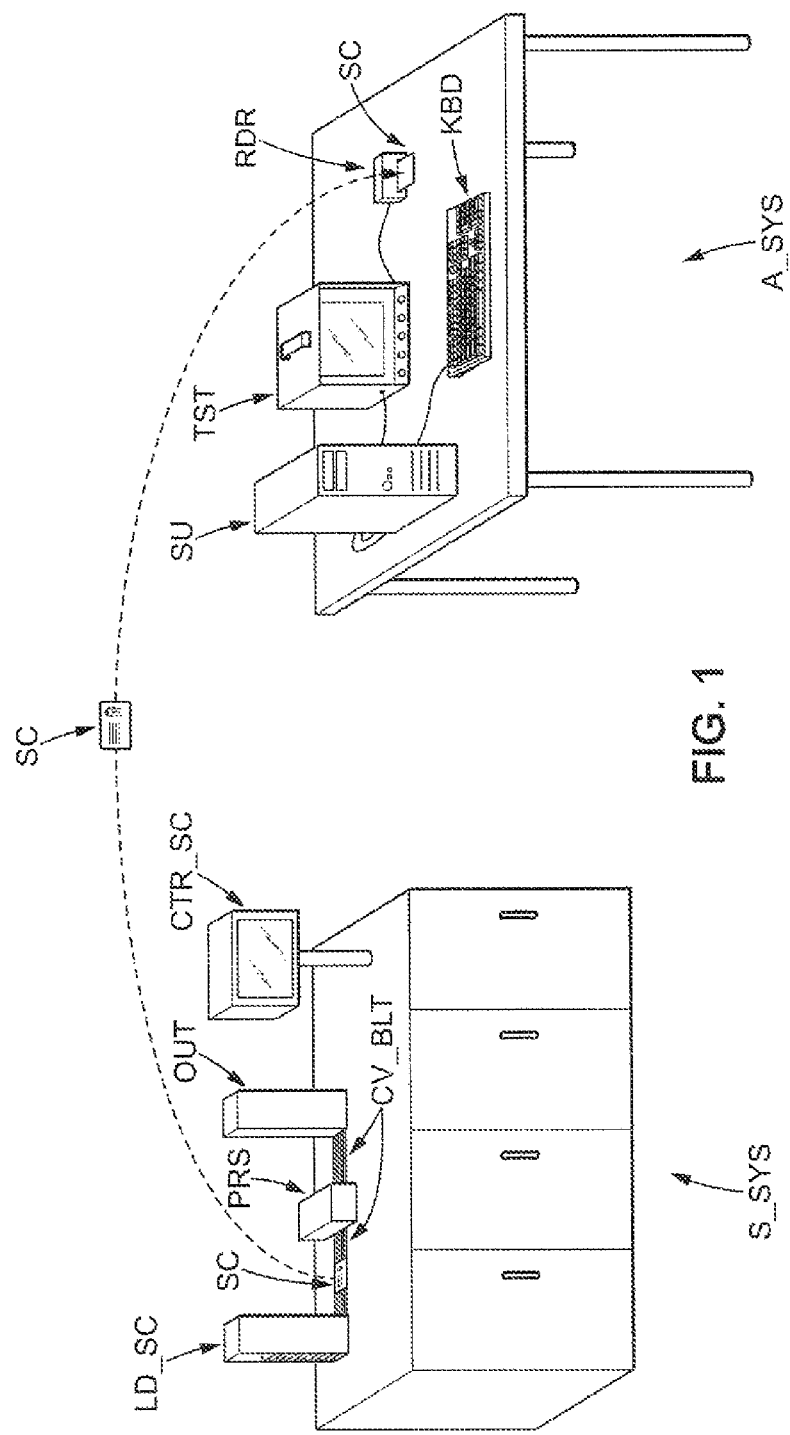
FIG. 1 illustrates a system for protecting a smart card SC comprising a secure storage system S_SYS and an authentication system A_SYS.

The authentication system A_SYS implemented by a testing system comprises a table whereon are placed a central unit SU (associated with a screen not shown), a test machine TST connected to the central unit SU, a keyboard KBD connected to the central unit SU, and a card reader RDR connected to the testing machine TST. The smart card SC personalized electrically by the electrical personalization module PRS is now connected in the card reader RDR, which may be a contact or contactless type card reader (a contact type reader is represented in FIG. 1). Before performing the required diagnostics, it is proposed to verify that the binary code to be subjected to the diagnostics is the correct one. For this purpose, the testing machine TST, connected by the secure link to the electrical personalization module PRS via the central unit SU, obtains the third hash and the random number. It then requests the smart card SC (via the reader RDR) to compute the third hash on the basis of the first hash and the binary code stored in the smart card SC, and the random number received. The smart card SC responds by returning the effective third hash. If it is equal to the third hash received, the authentication of the binary code is declared.

According to one possible implementation, the secure storage system S_SYS (for example the personalization module PRS thereof) transmits the second hash and the binary code to the authentication system A_SYS. The authentication system A_SYS is thus capable of recomputing this second hash.

On the basis of the first hash, the second hash and the random number, the authentication system A_SYS computes a third hash.

The smart card has (stores) the first hash.

The authentication system A_SYS has the second hash (and is capable of recomputing same). It also has the third hash and the corresponding random number and can retrieve the first hash (stored in the smart card) if authorized by the smart card. This third hash supplied to the authentication system A_SYS makes it possible to establish the non-modification of the binary code and the authenticity thereof. The authentication system A_SYS is capable of recomputing and verifying this third hash.

The authentication system A_SYS requests the smart card to compute a hash based on the following elements: first hash, second hash and random number. The smart card returns (if it is authentic) the third hash known from the authentication system A_SYS.

To ensure that the smart card carries out a genuine computation, the authentication system A_SYS modifies the random number (replaces it by another random number), recomputes a third hash after retrieving the first hash, and compares the result with a third hash computed by the smart card on the basis of the element supplied thereto according to a procedure as described in the preceding paragraph (with the modified random number).

Figure 2:
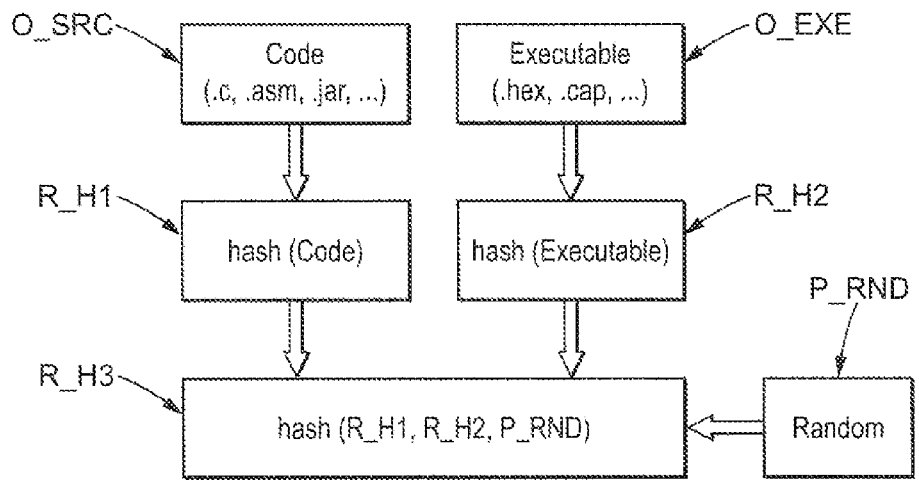
FIG. 2 illustrates various steps of a method according to one embodiment of the invention.

FIG. 2 illustrates the computation of a reference third hash by a secure storage system according to one possible embodiment of the invention.

A first operation consists of computing the first hash R_H1 of a source code O_SRC. A second operation consists of computing the second hash R_H2 of a binary code O_EXE corresponding to the source code O_SRC. A third operation consists of generating a random number P_RND. These three operations may be performed in an arbitrary order, or be performed in parallel if the architecture of the secure storage system permits (for example if it consists of a multitask system).

Finally, a third hash R_H3 is computed by applying a hashing algorithm to a concatenation of the first hash R_H1, of the second hash R_H2, and of the random number RND.

Figure 3:
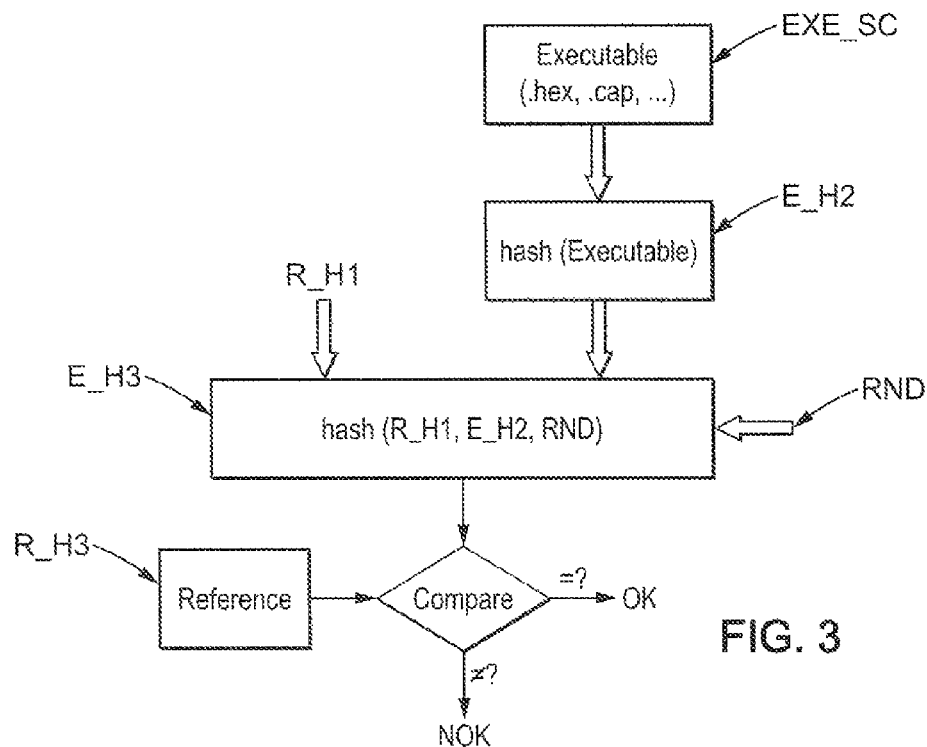
FIG. 3 illustrates various steps of a method according to a further embodiment of the invention.

FIG. 3 illustrates the computation of an effective third hash by an authentication system according to one possible embodiment of the invention, and the comparison thereof to a reference third hash for authentication purposes.

On request by the authentication system, a smart card storing a binary code EXE_SC for which the authenticity is to be verified computes a second hash E_H2 of this binary code. The authentication system transmits a number RND to the smart card (before or after computing the second hash E_H2, or even during for a multitask smart card, which is not common). The smart card then determines a concatenation of a first hash that it has previously stored, the second hash E_H2 that it has just computed and the number RND, then computes a third hash E_H3 of this concatenation. The concatenation is performed in an arbitrary but pre-agreed order (corresponding to that used for computing a reference third hash R_H3). The smart card returns this third hash E_H3 to the authentication system. The authentication system compares this third hash E_H3 to a reference third hash R_H3. If both hashes are equal, the binary code EXE_SC is authenticated.

Possible alternative embodiments are described hereinafter.

According to a first embodiment, a method for secure storage of a binary code O_EXE (official executable) in a smart card SC, comprises the computation, by a secure storage system S_SYS, of a first hash R_H1 on the basis of a source code O_SRC (official source code), said source code corresponding to the binary code O_EXE. As such, the binary code O_EXE may be the result of the compilation of the source code O_SRC.

The secure storage method comprises storing, by the secure storage system S_SYS, the first hash R_H1 and of the binary code O_EXE in the smart card SC. These two secure storages are advantageously performed during the same session (for example consecutively). They can be stored in different zones of the smart card (the first hash being optionally stored for example in a secure zone, while the binary code may be, if applicable, stored in a less secure zone). The smart card links the respective records of the first hash and the executable code. For example, it places these two records contiguously (which may infer that they are placed in the same memory zone—for example in a secure memory zone), or it associates them each with the same (common) index, or it associates each of the records with a pointer to the other record.

The secure storage method also comprises transmitting, by the secure storage system S_SYS to an authentication system A_SYS, a random number P_RND and a third hash R_H3, the third hash R_H3 being computed on the basis of a concatenation of the first hash R_H1, of a second hash R_H2 and of the random number P_RND, the second hash R_H2 being computed on the basis of the binary code O_EXE. The concatenation of the first hash, of the second hash and of the random number may be performed in any order, provided that the same order is used for the subsequent verification.

According to one possible implementation of the first embodiment, the source code is a code in C language. It may also consist of assembler language, or java language, or any other language (Multos language, C# language of .NET, etc.). According to one possible implementation of the first embodiment, the source code takes the form of one or a plurality of text files. The text files may notably be in ASCII format, or in a UNICODE format (UTF-8, UTF-16, etc.), or in any other suitable text format. According to one alternative embodiment, the source file may also comprise resources (metadata such as images, sounds, error messages, etc.) and may be compressed so as to occupy less space (for example in the form of a .JAR file for java applets). According to one possible implementation of the first embodiment, when the source code is distributed between a plurality of source files (which may be text files or any more complex files such as the .JAR files cited above), the computation of the first hash is performed after having previously concatenated the content of these source files (thus excluding any data other than the content, such as all the file headers, etc.). Concatenation may be performed by observing the alphabetical order of the name of the source files. This alphabetical order may use if applicable the access path of each source file if it can be envisaged (in the environment in question) that source files situated at different locations have the same name. Obviously, any other order may be adopted by convention. It is only important that the same convention is adopted by the different entities led to legitimately compute this first hash. Further implementations are possible. By way of alternative, it is for example possible to account for the headers and names of files when computing the hash (by concatenating not only the content of the files but also the headers). It is also possible, for example, to compress all the source files forming the source code O_SRC in a file (for example a ZIP file), and compute the hash of the resulting compressed file. This assumes that two separate compressions of the same file results in the same compressed file (the compression algorithm must be deterministic, and the compressed file must not include elements liable to fluctuate such as the date and time that the compression was performed).

The binary code O_EXE may be a file of the type .hex, .cap, etc.

According to one possible implementation of the first embodiment, the first, second and third hashes R_H1, R_H2 and R_H3 are computed with the same hashing algorithm (for example SHA-1, SHA-256, RIPEMD-160, MD5, or any other suitable algorithm for the intended application which may even include cryptographically very weak hashes such as, for example, a CRC algorithm such as CRC-8, CRC-16, CRC-32 or CRC-64). Codes deemed to be cryptographically secure (such as, at the present time, SHA-1 or SHA-256) are advantageous. Obviously, it would be possible alternatively to use different hashing algorithms to compute each of the hashes (or some thereof only—for example SHA-1 for the first hash and SHA-256 for the second and third hashes).

The random number P_RND is a predetermined random number, in that it is determined at random during an initial phase (by the secure storage system S_SYS), and does not vary further during subsequent authentication operations.

According to one possible implementation of the first embodiment, the random number P_RND is generated by the secure storage system S_SYS itself.

According to an alternative implementation of the first embodiment, the smart card SC generates the random number P_RND on request from the secure storage system S_SYS and (optionally) transmits same to the secure storage system S_SYS. Accordingly, the secure storage system S_SYS can merely send an order for the generation (and optionally storage) of the random number P_RND to the smart card, which can respond, after generating the random number P_RND, either by transmitting to the secure storage system this random number P_RND, or by storing this random number P_RND in the memory (or one of the memories) thereof, or both (storage and transmission to secure storage system). This may be advantageous in particular when the smart card comprises a cryptoprocessor equipped with a more secure random number generator than the random number generator of the secure storage system (i.e. capable of generating a less predictable random number P_RND).

According to a second embodiment, a secure storage method according to the first embodiment comprises storing, by the secure storage system S_SYS, the random number P_RND in the smart card SC. As specified above, it is even possible for the smart card SC itself to have generated the random number P_RND on behalf of the secure storage system S_SYS, in which case this storage can be performed even without the secure storage system having direct access to the random number P_RND generated (which may increase the security, in some circumstances, and particularly when this storage in the smart card SC is highly secure). In the case of the generation by the smart card SC of the random number P_RND, the storage, by the secure storage system S_SYS, of the random number P_RND in the smart card SC is understood as the instruction given by the secure storage system S_SYS to the smart card SC, to generate and store the random number P_RND.

The transmission, by the secure storage system S_SYS to an authentication system A_SYS, of the random number P_RND can then be performed by means of the smart card SC. This form of transmission is either cumulative or alternative with a direct transmission (without passing through the smart card SC) of the random number by the secure storage system S_SYS to the authentication system A_SYS. According to a third embodiment, a secure storage method according to the first or second embodiment comprises storing in the smart card SC, by the secure storage system S_SYS, at least one among the second hash R_H2 and the third hash R_H3.

Storing the second hash R_H2 in the smart card enables for example the smart card to verify (when it determined, according to a given security policy, that it is necessary, or when this is requested by an external entity) that the corresponding binary code (contained therein) is unchanged by recomputing the hash thereof and comparing same to R_H2.

According to an alternative, the storage of the second hash R_H2, if it is secure, and if the storage of the binary code is also secure, makes it possible, when applicable, to not have to recompute the hash of the binary code stored, and to merely use the stored value R_H2. A hacker seeking to use a fake binary code (and not having access either to the original binary code or to the hash R_H2 thereof) is not in a position to emulate R_H2, which generally does not need to be extracted from the smart card SC (as it can be used for only intermediate computations and/or internal verifications).

In the event of storage of the third hash R_H3 in the smart card, the transmission, by the secure storage system S_SYS to an authentication system A_SYS, of the third hash R_H3 can be performed by means of the smart card SC. According to one possible implementation of the third embodiment, this form of transmission is cumulative with direct transmission (i.e. without passing through the smart card SC) of the third hash R_H3 by the secure storage system S_SYS to the authentication system A_SYS. According to a further possible implementation of the third embodiment, this form of transmission is alternative (i.e. the transmission by means of the smart card SC can replace direct transmission).

According to a fourth embodiment, a method for the authentication of a binary code EXE_SC stored in a smart card SC comprises acquiring, by an authentication system A_SYS, a reference third hash R_H3. The fact that this third hash R_H3 is described by the adjective "third" does not presuppose the order in which it is obtained with respect to any other hashes, but is merely a means for naming it (and thus distinguishing it from other hashes).

This acquisition is performed in a secure manner. It consists for example of an acquisition carried out during a so-called upstream phase (for example during an electrical personalization of the smart card by a smart card manufacturer), i.e. prior to deployment of the smart card to the end user (cardholder) or intermediate user (certifying body, B2B client such as a bank or a telephone operator, etc.) thereof. This secure acquisition can be performed by secure communication (for example via secure Internet communication using SSL or VPN, or via a so-called "secure channel" specified by GlobalPlatform) of the reference third hash R_H3 between trusted entities. The authentication system A_SYS can thus (in particular) obtain the reference third hash R_H3 from a secure storage system S_SYS or from the smart card SC itself. It should be noted that a smart card can comprise multiple applications, of which some may be secure, others may not be (or be less secure), and that it may be useful, for example, to seek to ensure the authenticity of the binary code of a weakly secured application, using a secure application. A secure application can thus serve as a storage (and/or computing) entity for different hashes required according to different embodiments of the invention.

According to the fourth embodiment, the method comprises the acquisition, by the authentication system A_SYS, of an effective third hash E_H3 on the basis of a concatenation of a first hash R_H1, of a second hash E_H2 and of a random number RND, the first hash R_H1 being stored in the smart card SC, the second hash E_H2 being computed on the basis of the binary code EXE_SC to be authenticated. The authentication system A_SYS can for example request the smart card SC to recompute the effective third hash E_H3. According to one possible implementation, the second hash E_H2 is an effective second hash recomputed whenever required, on the basis of the actual content (at the time in question) of the binary code EXE_SC to be authenticated. As such, if this binary code EXE_SC is modified, the second hash E_H2 is modified. It is conceivable, according to some embodiments, that the smart card is capable of ensuring (by other means) that the binary code EXE_SC to be authenticated is not modifiable by a hacker. In such a scenario, and for these implementations only, it is possible to store in the smart card SC (securely) a second hash E_H2 once and for all and not to recompute same each time. This speeds up the processing, and does not actually add additional security (the security being in this instance guaranteed by another mechanism), but enables increased interoperability of the authentication of the executable code (between different types of smart cards, or even between smart cards that are personalized differently). It is even possible, in such a scenario, to directly store the effective third hash E_H3 for a certain random number (in particular for a predetermined random number P_RND), such that when the authentication is requested on the basis of this specific random number, it is accelerated (no recomputing). In order to avoid opening a "timing attack" security breach, it is preferable to only use this optimization when the acquisition request of E_H3 received by the card specifies (by identifying, but without transmitting same) that it is a predetermined random value P_RND (known in advance by the smart card SC) which is to be used. In other words, if an acquisition request function of E_H3 (implemented by the smart card SC on behalf of the authentication system A_SYS) adopts as a parameter a random number to be used by the smart card SC (and not merely an explicit or implicit reference to a predetermined random number which is pre-stored in the smart card SC), it is generally not appropriate from a security point of view to optimize this function by testing whether this random number set as a parameter is equal to a pre-stored random number, and in this scenario speeding up the processing by directly returning a corresponding pre-stored result (E_H3). Indeed, such an optimization (of the execution speed) could enable a hacker to guess the predetermined random number (if it is not too long) by exhaustive testing, or, independently of the length of this random number, to check whether a given number presumed to be potentially the predetermined random number is indeed said number (by comparing the computing time of E_H3 with the computing time for any random number).

The method includes authenticating, by the authentication system A_SYS, the binary code EXE_SC on the basis of a comparison of a reference third hash R_H3 and the effective third hash E_H3. As such, if the relevant reference third hash R_H3 and the effective third hash E_H3 (supposed to correspond thereto) are equal, the method considers the binary code EXE_SC to be authentic.

The reference third hash R_H3 is distinct from (but, in the absence of fraud, equal to) the effective third hash E_H3. Similarly, the reference is second hash R_H2 is distinct from (but, in the absence of fraud, equal to) the effective second hash E_H2.

Computing the effective third hash E_H3 in the smart card SC is advantageous in that it avoids extracting from an authentic smart card SC the authentic second hash E_H2 (case of a smart card SC storing an authentic binary code). Furthermore, in the case where the random number used is a predetermined random number P_RND known in advance from the smart card SC, this also avoids extracting the first hash R_H1 from the smart card to recompute a reference third hash R_H3. Using a predetermined random number P_RND (i.e. generated at random during an initial phase but subsequently unchanged during successive authentications) can nonetheless (under some circumstances) represent a playback risk (in the event of interception by a hacker).

According to one possible embodiment of the fourth embodiment, the comparison of the reference third hash R_H3 and the effective third hash is performed by the authentication system A_SYS. However, according to one possible alternative embodiment, the comparison can be performed by the smart card SC itself, which then needs to implement secure means for informing the authentication system A_SYS of the result (it would otherwise be possible to produce a hacked smart card always responding that the authentication is correct).

The acquisition, by an authentication system A_SYS, of a reference third hash R_H3 does not exclude the acquisition of a plurality of reference third hashes. According to one possible implementation of the fourth embodiment, a single reference hash R_H3 is obtained. According to a further possible implementation of the fourth embodiment, several (for example two) reference third hashes R_H3 are obtained.

According to one possible implementation of the fourth embodiment, the authentication system A_SYS obtains a reference third hash R_H3 on receiving same (it can for example receive it from a secure storage system S_SYS, optionally via the smart card SC as described above). It is thus possible to obtain a first reference third hash (for example a first reference third hash computed using a predetermined random number P_RND, and transmitted by a secure storage system S_SYS to the authentication system A_SYS). The authentication system A_SYS can also obtain (in addition to the first reference third hash cited above) a second reference third hash computed using a random number RND generated for example by the authentication system itself. The first reference third hash may be used for example in the context of a so-called "static" authentication (based on a predetermined random number P_RND, which is defined in advance by a third-party entity to the authentication system A_SYS) whereas the second reference third hash may be used for example in the context of a so-called "dynamic" authentication (based on a random number RND defined at each authentication attempt by the authentication system A_SYS itself, and thus preventing the playback of a reference third hash which could have been previously intercepted by a hacker). It is also possible to conduct a double authentication (involving two comparisons), one static and the other dynamic.

According to a fifth embodiment, an authentication method according to the fourth embodiment comprises transmitting the random number RND by the authentication system A_SYS to the smart card SC.

This is advantageous because this enables the computation of the effective third hash E_H3 by the smart card SC for any random number (and notably a random number chosen by the authentication system A_SYS itself), thus preventing certain attacks.

It is thus possible to set up in the smart card SC an effective third hash computing command, one of the input parameters whereof is the random number. For example, for a smart card implementing a protocol named T=0 (standardized in the standard ISO 7816), or for the protocol T=CL (standardized in the standard ISO 14443), a command APDU may comprise a parameter referred to as P3 (in the protocol T=0) corresponding to the length of the random number (if the random number is transmitted) and to zero otherwise. In the event of P3 being equal to zero, the card can use a predetermined random number P_RND stored in the card. As stated above, if a random number is transmitted as an input parameter, it is advantageous not to verify whether the random number received by the card corresponds to a predetermined random number P_RND already stored in the card, or at the very least, if this verification is nonetheless performed, not to perform optimized processing enabling a hacker to guess whether the input parameter corresponds to a predetermined random number (for example using a timing attack). On the other hand, optimized processing can be envisaged if P3 is zero (in this case, it is known by design that the random number used is a predetermined random number).

According to a sixth embodiment, the random number RND of a secure storage method according to the fourth or fifth embodiment is a predetermined random number P_RND received by the authentication system A_SYS (enabling static authentication as described above). The acquisition, by the authentication system A_SYS, of the reference third hash R_H3 then comprises (or consists of) the reception, by the authentication system A_SYS, of the reference third hash R_H3. As such, this reference third hash R_H3 does not need to be recomputed by the authentication system A_SYS, but can be merely received (securely). It can be received directly or indirectly. For example, the predetermined random number P_RND can be generated by the smart card SC (for example during the initial electrical personalization thereof by a smart card manufacturer). It can also be generated by a secure storage system S_SYS. In the latter scenario, the predetermined random number P_RND generated by the secure storage system S_SYS can be either directly transmitted by the secure storage system S_SYS to the authentication system A_SYS (for example via a telecommunications network, such as the Internet, but preferably using a secure protocol such as an IPSEC VPN, or via SSL), or transmitted indirectly, for example by being stored in the smart card SC by the secure storage system S_SYS and then read by the authentication system A_SYS from the smart card SC. Similarly, the reference third random number R_H3 can be transmitted directly or indirectly (for example via the smart card SC) from the secure storage system S_SYS to the authentication system A_SYS.

According to one possible embodiment, direct transmission of the predetermined random number P_RND (respectively of the reference third hash R_H3) is combined with storage of the predetermined random number P_RND (respectively of the reference third hash R_H3) in the smart card SC. The authentication system A_SYS can thus obtain the predetermined random number P_RND (respectively the reference third hash R_H3) in several ways (direct reception and reception from the smart card SC), in order to verify that the data received are the same regardless of the acquisition mode used. According to a further possible embodiment, direct transmission of the predetermined random number P_RND (respectively of the reference third hash R_H3) excludes any storage of the predetermined random number P_RND (respectively of the reference third hash R_H3) in the smart card SC.

According to a seventh embodiment, the random number RND of a secure storage method according to the fourth or fifth embodiment comprises choosing the random number RND by the authentication system A_SYS and reading the first hash R_H1 stored in the smart card SC by the authentication system A_SYS. The acquisition, by the authentication system A_SYS, of the reference third hash R_H3 comprises (or consists of carrying out) the computation of the reference third hash R_H3 by the authentication system A_SYS. The authentication system A_SYS is presumed to have the binary code for which it is seeking to verify the authenticity and can thus recompute the hash R_H2. Alternatively (or cumulatively), it can obtain R_H2 (preferably securely, in a similar manner to that which can be carried out for R_H3).

Advantageously, the reading by the authentication system A_SYS of the first hash R_H1 using the smart card is secured. Indeed, this first hash R_H1 is a sensitive data item which could facilitate an attack by a third party. The securing can be based on a secure channel of the type specified in the GlobalPlatform de facto standard mentioned above. It is advantageous to subordinate the reading of the first hash R_H1 to the knowledge of a secret other than a user PIN code, as this type of information (first hash R_H1) is not in principle intended to be accessible to the end user of the smart card SC (conventional holder of the PIN code), but rather to an administrator or intermediate user (telecommunications operator, bank, etc.) of the smart card. It is nonetheless possible, for example, to envisage a dedicated PIN code (distinct from the user PIN code) to protect access to the first hash R_H1.

According to an eighth embodiment, a method for protecting a smart card SC comprises a secure storage method according to any one of the first to the third embodiments, and an authentication method according to any one of the fourth to the seventh embodiments. The secure storage method thus serves as a prerequisite to the subsequent authentication method.

According to a ninth embodiment, a computer program comprises sequences of instructions implementing the steps of the method according to any one of the first to the eighth embodiments when they are executed by processors. This program can include subprograms. For example, the program can comprise a subprogram in assembler language (or in C, javacard, NET or Multos language) executed by a processor of the smart card SC in order to enable in particular the smart card to receive the first hash R_H1 and store same, compute a second hash E_H2, compute a hash E_H3, or more generally perform any step (of the embodiments cited above) which is incumbent on the smart card (or which can be executed optionally by the smart card). The program can also comprise a subprogram in C++ language (or in Visual Basic, Java language, etc.) executed by a processor (or a plurality of processors) of the secure storage system in order to perform any step (of the embodiments cited above) which is incumbent on the secure storage system (or which can be executed optionally by the secure storage system). The program can also comprise a subprogram in C++ language (or in Visual Basic, Java language, etc.) executed by a processor (or a plurality of processors) of the authentication system in order to perform any step (of the embodiments cited above) which is incumbent on the authentication system (or which can be executed optionally by the authentication system).

According to a tenth embodiment, non-transitory computer-readable storage media comprise a computer program according to the ninth embodiment. Accordingly, the tenth embodiment can consist for example of a hard drive (for example magnetic, optical or SSD) of a secure storage system according to one embodiment and a memory (for example ROM, Flash or EEPROM type) of a smart card according to one embodiment, or of a hard drive (for example magnetic, optical or SSD) of an authentication system according to one embodiment and a memory (for example ROM, Flash or EEPROM type) of a smart card according to one embodiment, or further of a hard drive (for example magnetic, optical or SSD) of an authentication system according to one embodiment, a hard drive (for example magnetic, optical or SSD) of a secure storage system according to one embodiment and a memory (for example ROM, Flash or EEPROM type) of a smart card according to one embodiment. Each storage medium thus stores the relevant part pertaining thereto. The memory of the smart card thus stores the subprograms of the smart card for the implementation of the method according to the embodiments according to the invention, the hard drive of the authentication system stores the subprograms executed by the authentication system for the implementation of the method according to embodiments of the invention, and the hard drive of the secure storage system stores the subprograms executed by the secure storage system for the implementation of the method according to embodiments of the invention.

According to an eleventh embodiment, a secure storage system S_SYS (which is a hardware system and not merely virtual) is arranged to compute a first hash R_H1 on the basis of a source code O_SRC, said source code O_SRC corresponding to a binary code O_EXE. This computation can be performed by an electronic circuit of the secure storage system, such as an electronic circuit comprising a microprocessor and an associated memory, this associated memory containing a suitable computer program for performing this computation. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic.

The secure storage system S_SYS is arranged to store the first hash R_H1 and the binary code O_EXE in the smart card SC. This storage operation can be performed by an electronic circuit of the secure storage system, such as an electronic circuit comprising a microprocessor and an associated memory, this associated memory containing a suitable computer program for performing this storage. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic. The electronic circuit can comprise network interfaces or other types of electronic communication interfaces (such as a communication interface with a smart card).

The secure storage system S_SYS is arranged to transmit to an authentication system A_SYS a random number P_RND and a third hash R_H3, the third hash R_H3 being computed on the basis of a concatenation of the first hash R_H1, a second hash R_H2 and the random number P_RND, the second hash R_H2 being computed on the basis of the binary code O_EXE. This transmission and these computations can be performed by an electronic circuit of the secure storage system, such as an electronic circuit comprising a microprocessor and an associated memory, this associated memory containing a suitable computer program for performing these transmissions and computations. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic. The electronic circuit can comprise network interfaces or other types of electronic communication interfaces.

According to one possible implementation of the eleventh embodiment, the secure storage system S_SYS is (or comprises) an electrical personalization system for smart cards. Such a system comprises in a known manner a computer, smart card guiding systems (for example conveyor belts), and electrical programming systems (contact or contactless) for smart cards. According to one possible implementation of the eleventh embodiment, the secure storage system S_SYS comprises (optionally in addition to the electrical personalization system cited above) an application development system (comprising for example a software development environment and a compiler), on the basis whereof the original source code is produced. This source code can thus be generated inside the secure storage system (but according to a possible alternative, it is generated outside the secure storage system and is subsequently transmitted thereto in order to enable the computation of the first hash R_H1).

According to one possible implementation of the eleventh embodiment, the secure storage system S_SYS is arranged to implement a method according to any one of the first, second or third embodiments. For this purpose, it can comprise one (or a plurality of) electronic circuit(s) comprising a microprocessor and an associated memory, this associated memory containing a suitable computer program for implementing said methods (in combination, if applicable, with a computer program executed by the smart card). Alternatively, each electronic circuit can be a dedicated electronic circuit, embodied for example using an FPGA, an ASIC, a microcoded circuit, a PAL, a GAL, a PLA, an SPLD, a CPLD, an EPLD, or any form of suitable wired logic. The electronic circuit can comprise network interfaces or other types of electronic communication interfaces.

A twelfth embodiment relates to an authentication system A_SYS for the authentication of a binary code EXE_SC stored in a smart card SC. This system is a hardware (and not merely virtual) system. It is arranged to acquire a reference third hash R_H3. This acquisition can be carried out using an electronic circuit (of the authentication system) comprising a microprocessor and an associated memory, this associated memory containing a suitable computer program for performing this acquisition. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic. The electronic circuit can comprise network interfaces or other types of electronic communication interfaces.

The authentication system A_SYS is arranged to acquire an effective third hash E_H3 on the basis of a concatenation of a first hash R_H1, of a second hash E_H2 and of a random number RND, the first hash R_H1 being stored in the smart card SC, the second hash E_H2 being computed on the basis of the binary code EXE_SC to be authenticated. This acquisition can be performed using an electronic circuit (of the authentication system) comprising a microprocessor and an associated memory, this associated memory containing a suitable computer program for performing this acquisition. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic.

The authentication system A_SYS is arranged to authenticate the binary code EXE_SC on the basis of a reference third hash R_H3 and the effective third hash E_H3. This comparison can be performed using an electronic circuit (of the authentication system) comprising a microprocessor and an associated memory, this associated memory containing a suitable computer program for performing this comparison. The electronic circuit can also be a dedicated electronic circuit, embodied for example using an FPGA, an ASIC, a microcoded circuit, a PAL, a GAL, a PLA, an SPLD, a CPLD, an EPLD, or any form of suitable wired logic.

According to one possible implementation of the twelfth embodiment, the authentication system A_SYS is a smart card testing machine. Such a machine can comprise a computer equipped with a smart card reader (contact and/or contactless), the computer comprising a storage medium (such as a hard drive) storing a computer program for testing the card. The machine can be arranged to perform tests intended to validate how the smart card operates, to identify the source of an error (software or hardware) observed during the use of the smart card, or to verify the level of security of the smart card.

According to one possible implementation of the twelfth embodiment, the authentication system A_SYS is arranged to implement a method according to any one of the fourth, fifth, sixth or seventh embodiments. For this purpose, it can comprise one (or a plurality of) electronic circuit(s) comprising a microprocessor and an associated memory, this associated memory containing a suitable computer program for implementing said methods (in combination, if applicable, with a computer program executed by the smart card). Alternatively, each electronic circuit can be a dedicated electronic circuit, embodied for example using an FPGA, an ASIC, a microcoded circuit, a PAL, a GAL, a PLA, an SPLD, a CPLD, an EPLD, or any form of suitable wired logic. The electronic circuit can comprise network interfaces or other types of electronic communication interfaces.

According to a possible alternative embodiment, the authentication system can delegate to the smart card the execution of a method according to any one of the fourth, fifth, sixth or seventh embodiments. According to a further alternative embodiment, the authentication system has access to the source code and is arranged to recompute the first hash (increased integrity verification).

According to a thirteenth embodiment, a system for protecting a smart card SC comprises a secure storage system S_SYS according to the eleventh embodiment and an authentication system A_SYS according to the twelfth embodiment. This protection system can thus implement a method according to the eighth embodiment.

The invention is not limited to the embodiments described above by way of example; it applies to further alternative embodiments.

The memories suitable for use are not limited to the examples given merely by way of illustration but cover any type of functionally equivalent memory.

The embodiments described in relation to the method according to the invention can be transposed to the systems, and to the computer programs and storage media according to the invention, and conversely.

The invention claimed is:

1. A method for secure storage of a binary code in a smart card comprising:
   /a/ computing, by a secure storage system, a first hash based on a source code, said source code corresponding to the binary code;
   /b/ storing, by the secure storage system, the first hash and the binary code in the smart card; and
   /c/ transmitting, by the secure storage system to an authentication system, a random number and a third hash, the third hash being computed on the basis of a concatenation of the first hash, a second hash and the random number, the second hash being computed on the basis of the binary code.

2. The secure storage method according to claim 1, comprising storing, by the secure storage system, the random number in the smart card.

3. The secure storage method according to claim 1, comprising storing in the smart card, by the secure storage system, at least one among the second hash and the third hash.

4. A method for authenticating a binary code stored in a smart card, comprising:
   /d/ acquiring, by an authentication system, a reference third hash;
   /e/ acquiring, by the authentication system, an effective third hash on the basis of a concatenation of a first hash, of a second hash and of a random number, the first hash being stored in the smart card, the second hash being computed on the basis of the binary code to be authenticated; and
   /f/ authenticating, by the authentication system, the binary code on the basis of a comparison of a reference third hash and the effective third hash.

5. The authentication method according to claim 4, comprising transmitting the random number by the authentication system to the smart card.

6. The authentication method according to claim 4, the random number being a predetermined random number received by the authentication system, acquiring, by the authentication system, the reference third hash comprising receiving, by the authentication system, the reference third hash.

7. The authentication method according to claim 4, comprising choosing the random number by the authentication system and reading the first hash stored in the smart card by the authentication system, acquiring, by the authentication system, the reference third hash comprising computing the reference third hash by the authentication system.

8. A method for protecting a smart card, comprising a method for secure storage of a binary code in a smart card, and a method for authenticating a binary code stored in the smart card,
   wherein the method for secure storage comprises:
      /a/ computing, by a secure storage system, a first hash based on a source code, said source code corresponding to the binary code;
      /b/ storing, by the secure storage system, the first hash and the binary code in the smart card; and
      /c/ transmitting, by the secure storage system to an authentication system, a random number and a third hash, the third hash being computed on the basis of a concatenation of the first hash, a second hash and the random number, the second hash being computed on the basis of the binary code; and
   wherein the method for authenticating comprises:
      /d/ acquiring, by an authentication system, a reference third hash;
      /e/ acquiring, by the authentication system, an effective third hash on the basis of a concatenation of a first hash, of a second hash and of a random number, the first hash being stored in the smart card, the second hash being computed on the basis of the binary code to be authenticated; and
      /f/ authenticating, by the authentication system, the binary code on the basis of a comparison of a reference third hash and the effective third hash.

9. A non-transitory computer-readable storage media comprising a computer program comprising sequences of instructions implementing the steps of the method according to claim 1 when they are executed by processors.

10. A secure storage system comprising one or more hardware processors,
    the secure storage system being programmed to execute, by the one or more processors, instructions to compute a first hash on the basis of a source code, said source code corresponding to a binary code;
    the secure storage system being programmed to execute, by the one or more processors, instructions to store the first hash and the binary code in a smart card;
    the secure storage system being programmed to execute, by the one or more processors, instructions to transmit to an authentication system a random number and a third hash, the third hash being computed on the basis of a concatenation of the first hash, of a second hash and of the random number, the second hash being computed on the basis of the binary code.

11. An authentication system for the authentication of a binary code stored in a smart card, the authentication system comprising
    one or more hardware processors,
    the authentication system being programmed to execute, by the one or more processors, instructions to obtain a reference third hash;
    the authentication system being programmed to execute, by the one or more processors, instructions to obtain an effective third hash on the basis of a concatenation of a first hash, of a second hash and of a random number, the first hash being stored in the smart card, the second hash being computed on the basis of the binary code to be authenticated;
    the authentication system being programmed to execute, by the one or more processors, instructions to authenticate the binary code on the basis of a comparison of a reference third hash and the effective third hash.

12. A system for protecting a smart card comprising a secure storage system comprising one or more processors and an authentication system comprising
    one or more hardware processors,
    the secure storage system being programmed to execute, by the one or more processors of the storage system, instructions to compute a first hash on the basis of a source code, said source code corresponding to a binary code;
    the secure storage system being programmed to execute, by the one or more processors of the storage system, instructions to store the first hash and the binary code in a smart card;
    the secure storage system being programmed to execute, by the one or more processors of the storage system, instructions to transmit to an authentication system a random number and a third hash, the third hash being computed on the basis of a concatenation of the first hash, of a second hash and of the random number, the second hash being computed on the basis of the binary code;

the authentication system being programmed to execute, by the one or more processors of the authentication system, instructions to obtain a reference third hash; the authentication system being programmed to execute, by the one or more processors of the authentication system, instructions to obtain an effective third hash on the basis of a concatenation of a first hash, of a second hash and of a random number, the first hash being stored in the smart card, the second hash being computed on the basis of the binary code to be authenticated;

the authentication system being programmed to execute, by the one or more processors of the authentication system, instructions to authenticate the binary code on the basis of a comparison of a reference third hash and the effective third hash.

* * * * *